United States Patent
Quinlan

(10) Patent No.: US 7,877,493 B2
(45) Date of Patent: Jan. 25, 2011

(54) METHOD OF VALIDATING REQUESTS FOR SENDER REPUTATION INFORMATION

(75) Inventor: Daniel Quinlan, San Bruno, CA (US)

(73) Assignee: Ironport Systems, Inc., San Bruno, CA (US)

( * ) Notice: Subject to any disclaimer, the term of this patent is extended or adjusted under 35 U.S.C. 154(b) by 56 days.

(21) Appl. No.: 11/429,393

(22) Filed: May 5, 2006

(65) Prior Publication Data

US 2007/0073660 A1    Mar. 29, 2007

Related U.S. Application Data

(60) Provisional application No. 60/678,391, filed on May 5, 2005.

(51) Int. Cl.
*G06F 15/16* (2006.01)
(52) U.S. Cl. .................. 709/229; 709/206; 709/219
(58) Field of Classification Search .................. 709/229
See application file for complete search history.

(56) References Cited

U.S. PATENT DOCUMENTS

| | | | |
|---|---|---|---|
| 4,956,769 A * | 9/1990 | Smith | 707/9 |
| 5,933,416 A | 8/1999 | Schenkel et al. | |
| 5,970,149 A * | 10/1999 | Johnson | 714/46 |
| 6,006,329 A | 12/1999 | Chi | |
| 6,119,236 A | 9/2000 | Shipley | |
| 6,161,185 A * | 12/2000 | Guthrie et al. | 726/5 |
| 6,334,193 B1 * | 12/2001 | Buzsaki | 714/2 |
| 6,453,327 B1 | 9/2002 | Nielson | |
| 6,507,866 B1 | 1/2003 | Barchi | |
| 6,654,787 B1 | 11/2003 | Aronson et al. | |
| 6,701,440 B1 | 3/2004 | Kim et al. | |
| 6,708,205 B2 | 3/2004 | Sheldon et al. | |
| 6,732,153 B1 | 5/2004 | Jakobson et al. | |
| 6,748,422 B2 | 6/2004 | Morin et al. | |
| 6,886,099 B1 | 4/2005 | Smithson et al. | |
| 7,149,778 B1 | 12/2006 | Patel et al. | |
| 7,171,450 B2 | 1/2007 | Wallace et al. | |
| 7,181,498 B2 | 2/2007 | Zhu et al. | |

(Continued)

FOREIGN PATENT DOCUMENTS

EP    1509014 A2    2/2005

(Continued)

OTHER PUBLICATIONS

Levine, J. "DNS Based Blacklists and Whitelists for E-Mail." IETF: Apr. 26, 2004. pp. 1-7.*

(Continued)

*Primary Examiner*—Asad M Nawaz
*Assistant Examiner*—Christopher D Biagini
(74) *Attorney, Agent, or Firm*—Hickman Palermo Truong & Becker LLP

(57) ABSTRACT

A method of validating queries for reputation scores of message senders comprises receiving, from a first host computer, a DNS format query to obtain a reputation score associated with a second host computer, wherein the query includes an authentication code; validating the authentication code; and only when validating the authentication code is successful, performing a DNS lookup in a reputation database and returning a DNS response that provides the reputation score associated with the second host computer.

28 Claims, 6 Drawing Sheets

U.S. PATENT DOCUMENTS

| | | | |
|---|---|---|---|
| 7,206,814 B2 | 4/2007 | Kirsch | |
| 7,219,148 B2 | 5/2007 | Rounthwaite et al. | |
| 7,272,853 B2 | 9/2007 | Goodman et al. | |
| 7,331,061 B1 | 2/2008 | Ramsey et al. | |
| 7,342,906 B1* | 3/2008 | Calhoun | 370/338 |
| 7,366,761 B2 | 4/2008 | Murray et al. | |
| 7,366,919 B1 | 4/2008 | Sobel et al. | |
| 7,409,708 B2 | 8/2008 | Goodman et al. | |
| 7,475,118 B2 | 1/2009 | Leiba et al. | |
| 7,523,168 B2 | 4/2009 | Chadwick et al. | |
| 7,627,670 B2 | 12/2009 | Haverkos | |
| 2002/0004908 A1 | 1/2002 | Galea | |
| 2002/0023135 A1 | 2/2002 | Shuster | |
| 2002/0059385 A1 | 5/2002 | Lin | |
| 2002/0073240 A1* | 6/2002 | Kokkinen et al. | 709/249 |
| 2002/0116463 A1 | 8/2002 | Hart | |
| 2002/0143888 A1* | 10/2002 | Lisiecki et al. | 709/214 |
| 2002/0198950 A1 | 12/2002 | Leeds | |
| 2002/0199095 A1 | 12/2002 | Bandini et al. | |
| 2003/0023875 A1 | 1/2003 | Hursey et al. | |
| 2003/0050988 A1 | 3/2003 | Kucherawy | |
| 2003/0069935 A1 | 4/2003 | Hasegawa | |
| 2003/0095555 A1 | 5/2003 | McNamara et al. | |
| 2003/0096605 A1 | 5/2003 | Schlieben et al. | |
| 2003/0109248 A1 | 6/2003 | Lewis | |
| 2003/0115485 A1 | 6/2003 | Milliken | |
| 2003/0149726 A1 | 8/2003 | Spear | |
| 2003/0185391 A1* | 10/2003 | Qi et al. | 380/44 |
| 2003/0191969 A1 | 10/2003 | Katsikas | |
| 2003/0208562 A1* | 11/2003 | Hauck et al. | 709/219 |
| 2003/0212791 A1 | 11/2003 | Pickup | |
| 2004/0006747 A1 | 1/2004 | Tyler | |
| 2004/0019651 A1 | 1/2004 | Andaker | |
| 2004/0054917 A1 | 3/2004 | Obrecht et al. | |
| 2004/0068542 A1 | 4/2004 | Lalonde et al. | |
| 2004/0083408 A1 | 4/2004 | Spiegel et al. | |
| 2004/0093384 A1 | 5/2004 | Shipp | |
| 2004/0117648 A1 | 6/2004 | Kissel | |
| 2004/0139165 A1 | 7/2004 | McMillan et al. | |
| 2004/0139314 A1 | 7/2004 | Cook et al. | |
| 2004/0167964 A1 | 8/2004 | Rounthwaite et al. | |
| 2004/0177110 A1 | 9/2004 | Rounthwaite et al. | |
| 2004/0177120 A1 | 9/2004 | Kirsch | |
| 2004/0181581 A1 | 9/2004 | Kosco | |
| 2004/0250134 A1 | 12/2004 | Kohler et al. | |
| 2004/0254990 A1 | 12/2004 | Mittal | |
| 2005/0060295 A1 | 3/2005 | Gould et al. | |
| 2005/0060643 A1 | 3/2005 | Glass et al. | |
| 2005/0071432 A1 | 3/2005 | Royston, III | |
| 2005/0080855 A1 | 4/2005 | Murray | |
| 2005/0080858 A1 | 4/2005 | Pessach | |
| 2005/0091320 A1 | 4/2005 | Kirsch et al. | |
| 2005/0204005 A1 | 9/2005 | Purcell et al. | |
| 2005/0228996 A1 | 10/2005 | Mayer | |
| 2005/0246440 A1 | 11/2005 | Yu | |
| 2005/0283837 A1 | 12/2005 | Olivier et al. | |
| 2006/0031306 A1 | 2/2006 | Haverkos | |
| 2006/0095410 A1 | 5/2006 | Ostrover et al. | |
| 2006/0161988 A1 | 7/2006 | Costea et al. | |
| 2008/0104186 A1 | 5/2008 | Wieneke et al. | |
| 2008/0104187 A1 | 5/2008 | Wilson et al. | |
| 2008/0256072 A1 | 10/2008 | Logan et al. | |
| 2008/0270540 A1 | 10/2008 | Larsen | |
| 2009/0019126 A1 | 1/2009 | Adkins | |

FOREIGN PATENT DOCUMENTS

| | | | |
|---|---|---|---|
| WO | WO 02/19069 A | 7/2002 | |

OTHER PUBLICATIONS

Andrews, M. "RFC 2308: Negative Caching of DNS Queries." IETF: Mar. 1998. pp. 1-19.*

Patent Cooperation Treaty, "Notification Concerning Transmittal of International Preliminary Report on Patentability," PCT/US2005/005498, received Sep. 12, 2006, 7 pages.

Current Claims, PCT/US2005/005498, 14 pages.

International Searching Authority, "Notification of Transmittal of the International Search Report and the Written Opinion of the International Searching Authority, or the Declaration," PCT/US05/19143, Dated Apr. 7, 2006, 8 pages.

Current Claims, PCT/US05/19143, 24 pages.

Garreston, "IronPort looks to be E-mail's Guardian", Network World, Sep. 2004, 2 pages.

Spam Assassin, "SpamAssassin: Tests Performed", Spam Assassin, Jun. 4, 2003, 51 pages.

Achelis, Steven B., "Technical Analysis from A to Z", Introduction—Moving Averages, Equis International, 2001, 12 pages.

Visualware, "VisualRoute Server", Visualware Inc., Mar. 12, 2001, 4 pages.

Kephart, Jeffrey O., et al., "Biologically Inspired Defenses Against Computer Viruses", International Joint Conference on Artificial Intelligence, 1995, 12 pages.

Mertz, David, "Spam Filtering Techniques", Aug. 2002, 8 pages.

A. Caldwell, "International Search Report," published by International Bueau of WIPO for PCT/US06/17780, Geneva, Switzerland, Jun. 19, 2008, 5 pages.

A. Caldwell, "Written Opinion of International Searching Authority," published by International Bureau of WIPO for PCT/US06/17780, Geneva, Switzerland, Jun. 19, 2008, 7 pages.

J. Levine, "DNS Based Blacklists and Whitelists for E-Mail," draft-irtf-asrg-dnsbl-00.txt, published by The Internet Society, United States, Apr. 26, 2004, 7 pages.

* cited by examiner

METHOD OF VALIDATING REQUESTS FOR SENDER REPUTATION INFORMATION

CROSS-REFERENCE TO RELATED APPLICATIONS; PRIORITY CLAIM

This application claims benefit of Provisional Appln. 60/678,391, filed May 5, 2005, the entire contents of which is hereby incorporated by reference as if fully set forth herein, under 35 U.S.C. §119(e).

This application is related to prior nonprovisional application Ser. No. 10/857,641, filed May 28, 2004; Ser. No. 10/856,693, filed May 28, 2004; Ser. No. 11/062,320, filed Feb. 17, 2005.

FIELD OF THE INVENTION

The present invention generally relates to message processing, such as e-mail processing in mail transfer agents. The invention relates more specifically to approaches for preventing attacks on a sender reputation service.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

DNS-based blacklists and whitelists for e-mail are described in J. Levine, "DNS Based Blacklists and Whitelists for E-Mail," draft-irtf-asrg-dnsbl-01.txt, Nov. 16, 2004. The term "DNSxL" is used as shorthand to refer to either a DNS-based blacklist (DNSBL) or a DNS-based whitelist (DNSWL).

IronPort Systems, Inc. has introduced a service termed "SenderBase Reputation Score" or SBRS. Using SBRS, a mail transfer agent configured with appropriate software can issue a query to a database that stores information about the reputation of senders of electronic messages. The database replies with a value indicating a sender's reputation. Based on the value, the mail transfer agent can determine whether to accept or reject the message.

In one implementation of SBRS, a sender reputation list is implemented in the form of a DNSxL. The DNSxL sender reputation list enables the use of less fine-grained sender reputation score data by devices and services that are unable to process the actual scores directly. In one approach, real-valued sender reputation list scores are separated or "discretized" into a finite set of "bins." These bins are associated with standard DNS responses, indicating various ranges of reputation scores. Further, the DNSxL format is supported by many clients, and allows a wider range of devices and services to use sender reputation list.

However, because many clients support DNSxL format, a reputation service could be subject to a denial-of-service attack by clients that send large numbers of successive queries that request reputation values for non-existent senders or network addresses. To prevent such attacks, there is a need to identify valid and invalid clients and to control their access to the service. There is a related need to perform validation and control in a way that is computationally "light" for both clients and the reputation service, and allows for time-limited access as well as distinct service groups.

Message authentication code (MAC) approaches are known for enabling a receiving network node to determine if a message has been modified in transit from a sender. Some MAC approaches are based on performing a one-way hash over the message using a collision-resistant, fixed-length-output hash algorithm such as Message Digest 5 (MD5).

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
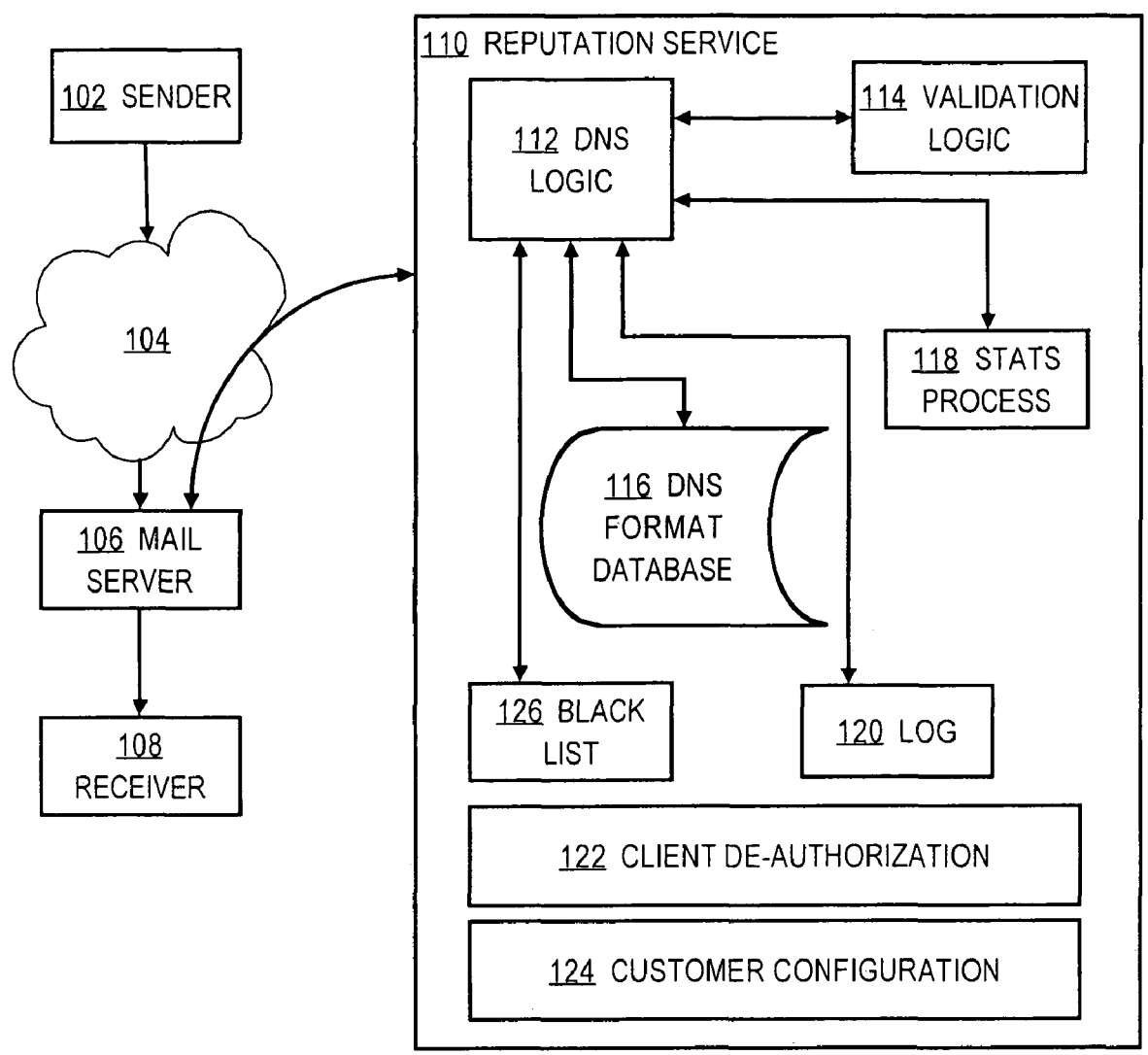
FIG. 1 is a block diagram that illustrates an overview of a network arrangement that includes a reputation service.

A method and apparatus for validating requests for sender reputation information is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Structural and Functional Overview
   3.0 Validating Reputation List Queries
      3.1 Process Initiation
      3.2 Query Validation
      3.3 Determining and Performing Responsive Actions
      3.4 Blacklist and Log File Management
   4.0 Implementation Mechanisms—Hardware Overview
   5.0 Extensions and Alternatives
   1.0 General Overview The needs identified in the foregoing Background, and other needs and objects that will become apparent for the following description, are achieved in the present invention, which comprises, in one aspect, a method for validating queries for reputation scores of message senders comprises receiving, from a first host computer, a DNS format query to obtain a reputation score associated with a second host computer, wherein the query includes an authentication code; validating the authentication code; and only when validating the authentication code is successful, performing a DNS lookup in a reputation database and returning a DNS response that provides the reputation score associated with the second host computer.

According to one feature of this aspect, an NXDOMAIN record is sent to the first host computer when validating the authentication code is unsuccessful. In another feature, the method determines whether the first computer is listed in a blacklist, and sends an NXDOMAIN record to the first host computer without validating the authentication code when the first computer is listed in the blacklist.

Another feature comprises establishing a master domain and a plurality of subdomains, wherein each of the subdomains is associated with a respective customer group; and receiving the DNS format query from the first computer at a particular subdomain that is associated with a particular customer group, wherein the first computer is associated with the particular customer group, wherein the DNS format query includes an identifier of the particular customer group.

Yet another feature provides for retrieving configuration information associated with the particular customer group, wherein the configuration information for the particular customer group maps one or more discrete sets of reputation values to respective responsive actions; determining, by mapping the reputation score for the second host computer to one of the discrete sets in the configuration information, a particular responsive action; and performing the particular responsive action.

Still another feature involves creating and storing, in a log file, a log entry that identifies the first computer and whether validation of the DNS format query was successful; periodically reading the log file, determining whether the first computer has issued a number of queries that exceeds an invalidation threshold for the first computer, and adding the first computer to the blacklist when the first computer has issued a number of queries that exceeds an invalidation threshold for the first computer.

A further feature provides for retrieving configuration information associated with the first computer, wherein the configuration information identifies a time in which the first computer is allowed to send queries; determining whether the time has expired; and adding the first computer to the blacklist when the time has expired.

In other aspects, the invention encompasses a computer apparatus and a computer-readable medium configured to carry out the foregoing steps.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

2.0 Structural and Functional Overview

Figure 3A:
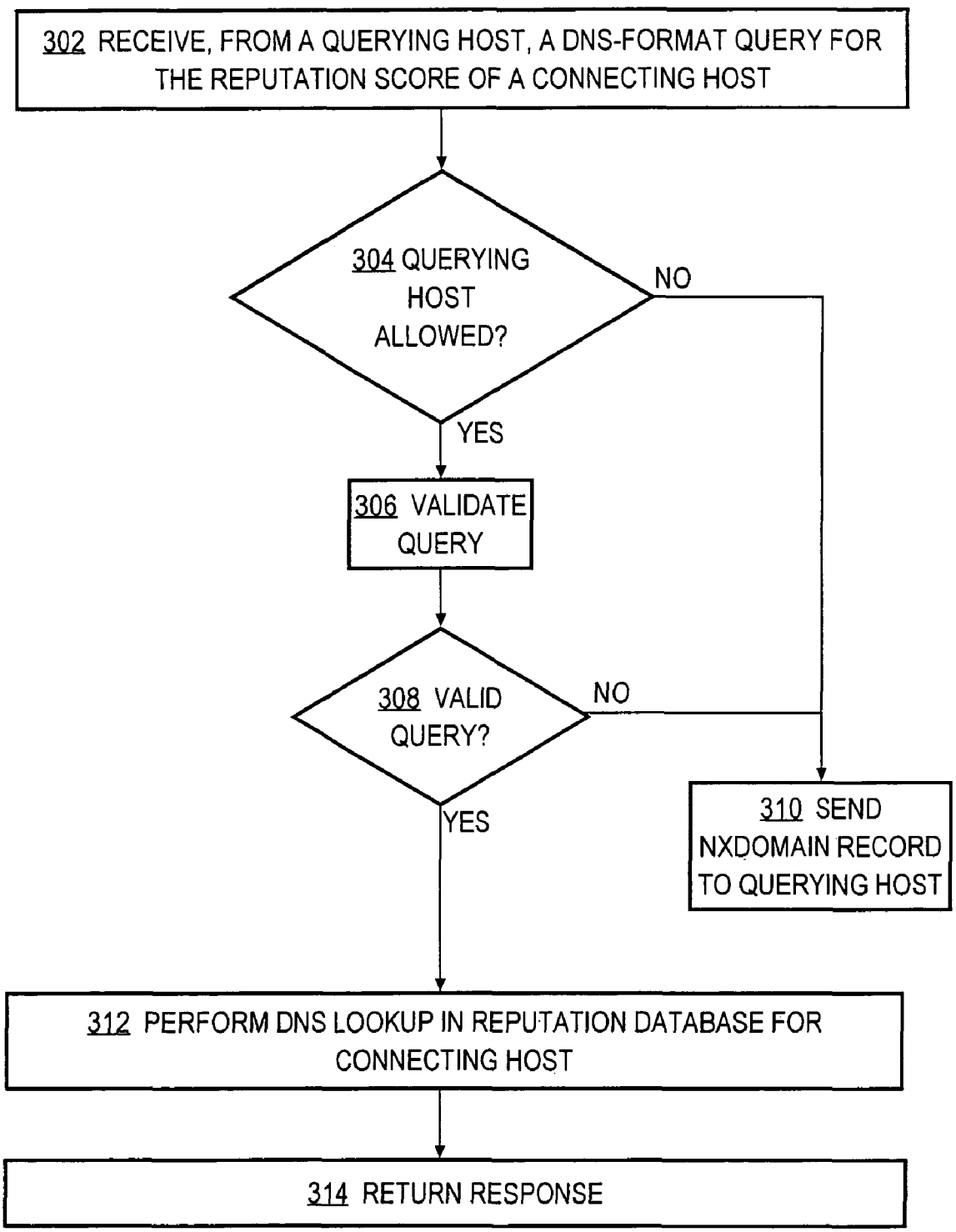
FIG. 3A is a flow diagram that provides a high-level view of a process of validating queries.

An approach to identify valid and invalid clients and to control their access is now described with reference to FIG. 1 and FIG. 3A. FIG. 1 is a block diagram that illustrates an overview of a network arrangement that includes a reputation service; FIG. 3A is a flow diagram that provides a high-level view of a process of validating queries.

FIG. 1 is a block diagram of one system in which an embodiment may be used. A sender 102 is coupled through network 104 to mail server 106. The mail server 106 hosts a mailbox on behalf of receiver 108. In an embodiment, sender 102 communicates with mail server 106 using simple mail transfer protocol (SMTP). Sender 102 may comprise another mail server, a mail gateway, or an end station that incorporates a mail server.

A reputation service 110 is coupled through network 104 to mail server 106. Using reputation service 110 as described herein, mail server 106 can request and receive a reputation value associated with sender 102, for use as a basis for determining whether to accept mail connections from sender 102, to deliver messages to receiver 108, or take other actions. In one embodiment, reputation service 110 comprises DNS logic 112, validation logic 114, DNS format database 116, statistics process 118, log process 120, blacklist 126, client de-authorization logic 122, and one or more customer configuration files 124.

DNS logic 112 processes DNS queries that seek reputation information about sending hosts, such as sender 102. Validation logic 114 comprises one or more computer programs or other software elements that implement the functions described herein, and is configured to identify queries from clients not authorized to use the service, and to refuse them service while making their revalidation easy and fast.

DNS format database 116 stores reputation information about a large number of message senders in the form of DNS whitelists or blacklists. The term "DNSxL" is used herein as shorthand to refer to either a DNS-based blacklist (DNSBL) or a DNS-based whitelist (DNSWL). In the "SenderBase Reputation Score" or SBRS service of IronPort Systems, Inc., a mail transfer agent configured with appropriate software can issue a query to a database that stores information about the reputation of senders of electronic messages. The database replies with a value indicating a sender's reputation. Based on the value, the mail transfer agent can determine whether to accept or reject the message. A sender reputation list comprises a DNSxL. In one approach, real-valued sender reputation list scores are separated or "discretized" into a finite set of logical bins. Bins are associated with standard DNS responses, indicating various ranges of reputation scores.

Statistics process 118 and log process 120 can interact with a log file that records information about queries of mail servers, such as mail server 106. Blacklist 126 comprises a list of mail servers that are not allowed to use reputation service 110. The reputation service 110 maintains blacklist 126 as further described herein. Client de-authorization logic 122 comprises one or more computer programs or other software elements for managing blacklist 126. Customer configuration files 124 store configuration information for different customers of the reputation service 110, as further described below.

An operational example is now described with reference to FIG. 3A. For purposes of illustrating a clear example, FIG. 3A is described in the context of the embodiment shown in FIG. 1. However, the broad approach of FIG. 3A can be used in many other contexts and embodiments.

As a hypothetical example, assume that a sender 102 sends one or more email messages through network 104 toward receiver 108. The messages are received first at mail server 106, which hosts a mailbox or mail filter on behalf of receiver 108.

Mail server 106 issues a query to a reputation service 110, seeking to obtain a reputation score value indicating whether sender 102 is a reputable mail sender. The query may include sender identifying information, such as a network address, for example, an IP address. The query may be formatted as a DNS lookup, and in one approach, DNS type A records are returned to queries about connecting network addresses indicating their reputation. Thus, at step 302 (FIG. 3A), reputation service 110 receives, from a querying host in the form of mail server 106, a DNS-format query to obtain the reputation score of a connecting host, namely sender 102.

In step 304, reputation service 110 determines whether the querying host is allowed to process queries using the service. Step 304 may involve determining whether mail server 106 is listed in blacklist 126. If the querying host is not allowed to use the service, then in step 310 an NXDOMAIN record is returned to the querying host. Sending an NXDOMAIN record is equivalent to informing the querying host that sender 102 is not listed in the database of the reputation service 110.

Otherwise, in step 306, the query is validated before it is processed. In one embodiment, reputation service 110 forwards the query to DNS logic 112, which validates the query using validation logic 114. Any of a plurality of validation mechanisms may be used, and specific techniques are described further below.

If the query is validated, as shown in step 308, then a DNS lookup is performed in the reputation database to identify a score for the connecting host. For example, DNS logic 112 applies the query to a DNS format database 116, which is structured with DNS records. In step 314, a response is returned to the querying host.

In one embodiment, DNS logic 112 can generate several kinds of responses to mail server 106. As a first example, DNS logic 112 can indicate whether a particular sender is listed or unlisted in database 116. As a second example, DNS logic 112 can facilitate threshold-based blocking in which a range of response codes are returned for various reputation levels, which a client can treat differently. As a third example, DNS logic 112 can perform header tagging, involving the addition of descriptive reputation information to headers or subjects.

Information about queries that are received, and the response that was given, is maintained in log 120 for analysis by other processes.

If the test of step 308 is negative, then control passes to step 310 in which an NXDOMAIN record is returned to the querying host. Thus, querying hosts that send invalid queries are rapidly refused service without performing more computationally intensive tasks, such as steps 312, 314.

3.0 Techniques for Validating Reputation List Queries

Figure 2:
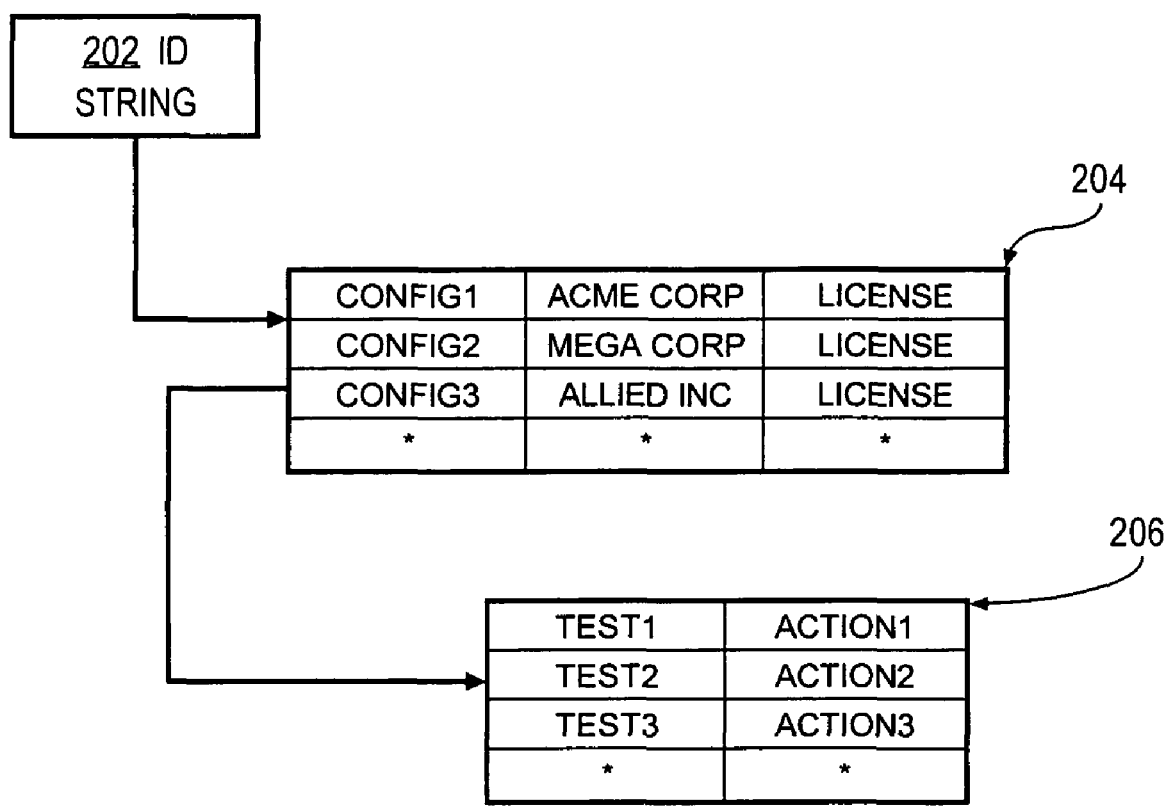
FIG. 2 is a block diagram showing an example data structure representation that can be used for mapping configuration files to querying host domains.
Figure 3B:
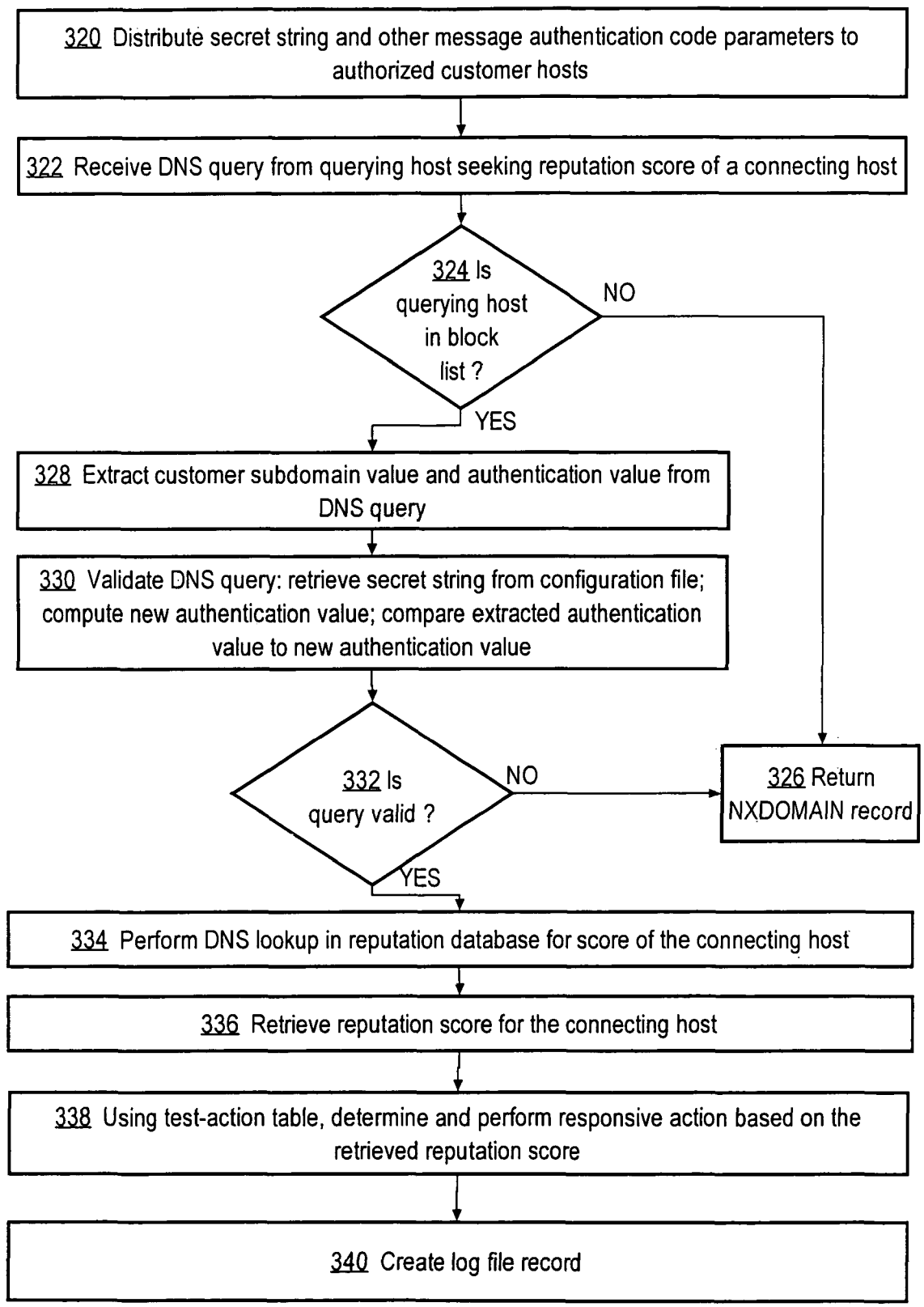
FIG. 3B is a flow diagram that provides a more detailed view of a process of validating queries.
Figure 3C:
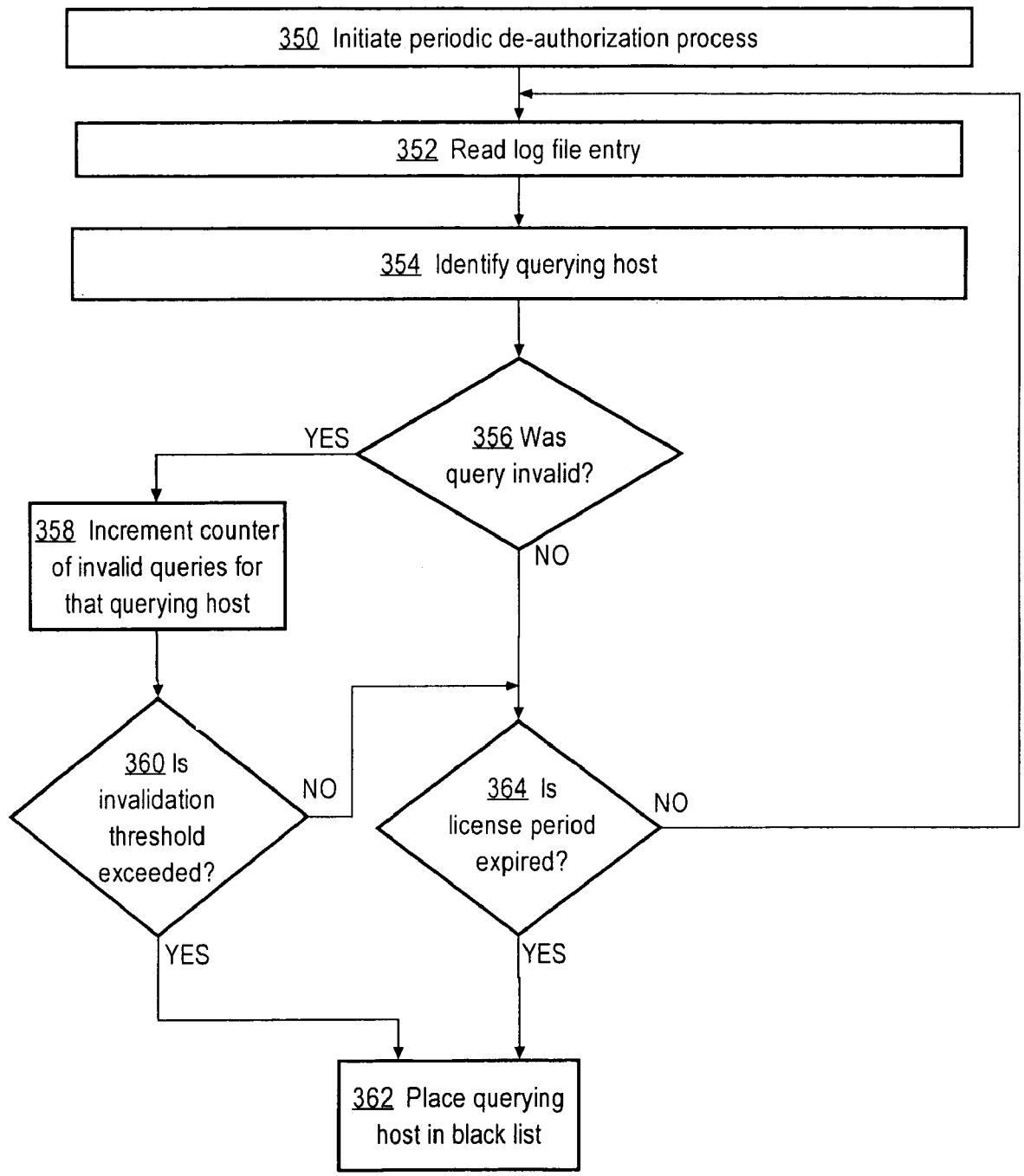
FIG. 3C is a flow diagram of an approach for de-authorizing querying hosts.

A more detailed embodiment of the broad approach herein is now described with reference to FIG. 2, FIG. 3B, and FIG. 3C. FIG. 2 is a block diagram showing an example data structure representation that can be used for mapping configuration files to querying host domains; FIG. 3B is a flow diagram that provides a more detailed view of a process of validating queries; and FIG. 3C is a flow diagram of an approach for de-authorizing querying hosts.

3.1 Process in Initiation

In step 320, a secret string value and other message authentication code parameters are distributed to authorized customer hosts. The secret string value is a data set that authorized clients use to prove authorization to the reputation service 110, as further described below. Other message authentication code parameters may comprise an identification of what message authentication algorithm should be used (MD2, MD4, MD5, etc.) and a hash key for the algorithm to use in computing message authentication values. Step 320 may involve any appropriate key distribution mechanism, the details of which are beyond the scope of this disclosure. What is important is that all authorized mail servers or other querying hosts receive the secret string value and message authentication parameters.

In an embodiment, a plurality of mail servers 106 may be organized in one or more customer groups. In this description, the term "customer group" refers to the subset of clients making requests associated with a particular relationship or partner of the reputation service. For example, mail server 106 may be associated with a customer of an entity that provides the reputation service 110 and that customer may have more than one mail server; all mail servers making requests form a customer group. Information identifying customer groups and the network addresses of mail servers within the customer groups may be stored in database 116 or in another data repository associated with reputation service 110.

For a given customer group, a configuration file 124 specific to that customer group specifies a mapping of scores to responses, how queries are formatted, and desired responses. Using separate configuration files 124 for each customer group allows different relationships to have different configurations and to update independently.

In an embodiment, reputation scores in database 116 are discretized, and configuration files 124 indicate what actions to take for discrete ranges of scores. In one approach, score ranges and their associated responses are indicated in the configuration file 124, on a per-subdomain basis. Blacklist-only users only specify a set of negative ranges, so any network addresses or IP addresses with scores above the highest range of interest will receive an NXDOMAIN response, as though they were not listed.

In step 322, a DNS query is received from a querying host seeking the reputation score of a connecting host. For example, mail server 106 creates and sends a DNS lookup query to reputation service 110 and identifying an IP address of sender 102.

In step 324, a test is performed to determine if the querying host is in a list of blocked hosts. The list may comprise blacklist 126. If the querying host is blocked, then control passes to step 326, in which an NXDOMAIN record is returned. The NXDOMAIN record effectively provides no substantive information to the querying host, in a manner that rapidly refuses service to blocked hosts and is compatible with standard DNS processing and does not require a special error-reporting protocol or message.

If the querying host is not blocked, then in step 328, a customer subdomain value and authentication value are extracted from the received query. In an embodiment, DNS domains specified in a query vary according to the customer. In one embodiment, each customer group has a specific subdomain of a master domain to query, as described further below. For example, the master domain of reputation service 110 could be "senderbase.org," and each customer has a particular subdomain, such as "acme.senderbase.org" for a customer named "Acme Corporation." Each subdomain can set specific options relating to the service using configuration files 124, as described further below.

An implementation of a reputation service 110 is described in prior nonprovisional application Ser. No. 10/857,641, filed May 28, 2004; Ser. No. 10/856,693, filed May 28, 2004; Ser. No. 11/062,320, filed Feb. 17, 2005 (the "Reputation Service Disclosures"). In one embodiment, a query from mail server 106 to reputation service 110 is formatted in the manner described in the Reputation Service Disclosures, with an additional authentication value. The authentication value may comprise a one-way hash of the query. The authentication value is used to validate the query.

In an embodiment, queries are formatted as an extended subdomain of the master domain of reputation service 110 (e.g., senderbase.org). For example, a query about an IP address "a.b.c.d" is as follows:

d.c.b.a.[metafields].[query-subdomain].senderbase.org

The [metafields] element comprises one or more values, delimited by period characters, containing additional information about the query, such as version information, or authentication data. The [query-subdomain] element identifies the relevant subdomain of the reputation service 110 that is handling DNSxL queries for the customer who has issued the query: "dnsxl-customer-1", for example. If versioning information is included, the versioning information is provided after the hash string and before the subdomain. Thus, a query about a connecting host with an IP address of "1.2.3.4" may have the form:

4.3.2.1.extra-information.dnsxl-customer-1.senderbase-.org.

According to one embodiment, the [metafields] element of the foregoing query comprises a unique identifier string. The identifier string maps to a DNSxL configuration, a customer value, and a specific licensing period. FIG. 2 is a block diagram showing an example data structure representation that can be used for the mapping.

In FIG. 2, an identifier string 202 maps to an association 204 of a configuration, customer value, and licensing period. The configuration is stored in a table 206 organized as an array of tuples of tests and associated actions. The customer value identifies a customer. A customer mapping is provided because whenever a contract or evaluation period terminates, all queries to that DNS zone will return NXDOMAIN.

The licensing period identifies a specific licensing period and supports a business model in which the reputation service 110 collects periodic fees for providing service to customers. In an embodiment, after the licensing period ends, all queries to the associated DNS zone will return NXDOMAIN. The licensing period value is optional, and can be omitted in another embodiment.

As an implementation example, the identifier string may have a value of "customer". The license period value represents a license series that is rotated every 6 months, and the customer is responsible for updating its licensed customers to use the new series. Six months after each license series expires, the system starts delivering NXDOMAIN replies. Thus, there will be 2-3 license series in active use at any one time. Enforcement of the licensing period is described further below in connection with FIG. 3C. The use of test-action table 206 is described further below relating to step 338.

3.2 Query Validation

In step 330, the received DNS query is validated. In one implementation, a secret string is retrieved from a configuration file associated with the customer group that includes the querying host. A new authentication value is computed based on the retrieved secret string and the network address for which the querying host is requesting information. The authentication value that was extracted at step 328 is compared to the new authentication value. If the authentication values match, then the DNS query is valid, as tested at step 332.

In an embodiment, configuration file 124 specifies the secret string that is used to authorize queries. Most values are strings or integers; some, such as the score ranges, are specified as a CSV string of (score threshold, response code) pairs, colon-delimited. Table 1 presents a sample configuration file:

TABLE 1

EXAMPLE CONFIGURATION FILE

[dns]
query_domain: dnsxl-jupiter
default_ttl: 30
default_retries: 3
txt_response: http://ww.senderbase.org?q=[IP]
[authorization]
hash_key: [DATESTRING]
invalidation_threshold: 100
invalidation_horizon: 1 month
[discretization]
score_ranges: -5:127.0.0.5,-4:127.0.0.4,-3:127.0.0.3,-2:127.0.0.2

In the embodiment of Table 1, the [authorization] section of the configuration file contains all fields needed for validation of the associated subdomain or customer group, including:

| | |
|---|---|
| hash_key | The secret string used to salt the authentication hashes for this subdomain. |
| invalidation_theshold | The number of invalid queries a client IP can make before being refused service |
| invalidation_horizon | The time limit beyond which invalid queries are ignored - if any. |

The secret string or hash key that is used to calculate hash values is distributed to the smallest possible group. Ideally, the hash key is changed regularly, but this policy may vary in different customer groups, according to their technical details.

According to one embodiment, validation logic 114 performs step 330 to validate each query received at DNS logic 112 before the query is processed in later steps. In one approach, each query comprises a hash value that is calculated using a secret value that is distributed only to authorized clients, e.g., mail server 106.

In one approach, queries with validation information are formatted as an extended subdomain of a master domain of reputation service 110, e.g., senderbase.org. For example, a query about an IP "a.b.c.d" is as follows:

d.c.b.a.[hashstring].[query-subdomain].senderbase.org

The [hashstring] element comprises a representation of an authorization hash. In one embodiment, the [hashstring] value is determined based on performing a one-way hash function on the secret string concatenated with the network address that is being queried about. A hash function such as MD5 may be used. Thus, a query about a connecting host with IP address "1.2.3.4" could look something like the following, depending on the value of the "secret" used to calculate the hash string:

4.3.2.1.150b87d5d7fce42bf6822a561c6d8b2b.dnsxl-customer-1.senderbase.org

In one embodiment, the new hash is an MD5 hash based on a string resulting from directly concatenating the network-order, dotted-quad IP string to the end of a previously distributed secret string. Thus, if mail server 106 is querying about IP "1.2.3.4" and using passphrase "passphrase for april," the following hash string would result:

$$[\text{hashstring}] = MD5([\text{secret}] + \text{'d.c.b.a'})$$

$$= MD5(\text{``passphrase for april''} + \text{``4.3.2.1''})$$

$$= MD5(\text{``passphrase for april4.3.2.1''})$$

$$= 150b87d5d7fce42bf6822a561c6d8b2b$$

Therefore, given the IP address "1.2.3.4" and the secret phrase "passphrase for april", only the first of the following queries is valid:

4.3.2.1.150b87d5d7fce42bf6822a561c6d8b2b.dnsxl-customer.senderbase.org 4.3.2.1.150b87d5d7fce42bf68.dnsxl-customer-1.senderbase.org 4.3.2.1.999b87d5d7fce42bf6822a561c6d8b2b.dnsxl-customer-1.senderbase.org 4.3.2.1.150b87d5d7fce42bf6822a561c6d8b2b.dnsbl-customer-1.senderbase.org In this approach, a correct [hashstring] value provides to the reputation service 110 that the inquiring host is authorized to send reputation service queries, because the inquiring host has proved knowledge of the secret string and asserted that the connecting host network address has not been changed in transit.

In one approach, validation of queries is performed "offline." In an offline approach, control passes from step 328 to step 334, so that every query is answered if the requesting network address is not in the blacklist at the time the query is received. A separate process implements steps 330, in which a query is validated by checking the included hashstring against a new hash that is calculated from the query.

3.3 Determining and Performing Responsive Actions

Referring again to FIG. 3B, if the query is valid at step 332, then in step 334 a DNS lookup is performed in the reputation database to obtain a reputation score for the connecting host. The reputation score is retrieved from the database at step 336.

In step 338, a responsive action is determined, for example, based on mapping the retrieved reputation score to the test-action table 206 of FIG. 2. The responsive action is then performed. In the test-action table 206, valid tests are logical expressions combining one or more reputation score values using standard operations (<, >, ==, !=, eq, ne, etc.). In an alternative embodiment, tests can include any of several variables. For example, in one embodiment, tests can include an SBVS score, one or more URIBL listings, and per-blacklist status values.

In the test-action table 206, in one embodiment, valid actions may include any of the following: Default result for a particular IP address query is NXDOMAIN; add an A record result as result named <result> and set it to <IP address>; replace A record result number with the logical AND of <mask> and A record result number <number>; set TXT record result to <text>. The set of A records returned is the list of all results named.

As one example of options for the configuration table, the values shown in TABLE 2 may be used. This example presumes that customer policy allows the system to pick different actions based on the return IP address result. One IP address is returned with a basic score.

TABLE 2

EXAMPLE TEST - ACTION TABLE

| Test | Action |
| --- | --- |
| SBRS <= −5 | add A record "paranoid" of 127.0.0.5 |
| SBRS <= −4 && SBRS > −5 | add A record "cautious" of 127.0.0.4 |
| SBRS <= −3 && SBRS > −4 | add A record "moderate" of 127.0.0.3 |
| SBRS <= −2 && SBRS > −3 | add A record "aggressive" of 127.0.0.2 |

In one embodiment, a query to reputation service 110 causes DNS logic 112 to return one of the following records:

1. An A record response of the type described in Levine et al. such as "127.0.0.3"
2. A TXT record, comprising a URL pointing to summary of main external reasons for score.
3. An ANY record, comprising TXT and A records.
4. An NXDOMAIN response, which is returned for any unknown IP, or any IP whose score isn't assigned to a bin.

Other fields may be passed back in response to a query for reputation results. As an example, a response field may include a list of factors that specify information such as which blacklist an IP address is in, or other more specific information maintained locally about the IP address. The list may comprise codes that map to a table of blacklists. This approach provides an extensible approach for maintaining DNS data that can be changed over time to provide new response data.

3.4 Blacklist and Log File Management

In one embodiment, at step 338, when DNS logic 112 is ready to issue a response to mail server 106, a network address of the mail server 106, specified in a header of the client query, is checked against blacklist 124. Thus, reputation service 110 maintains a list of servers or clients that are unlicensed or unauthorized and from whom queries are always refused.

In step 340, a log file record is created and stored to describe the querying host and the result of the query, whether valid or invalid. Thus, step 326 also may involve creating and storing a log file record indicating that the querying host made an invalid query.

In one embodiment, reputation service 110 may maintain a status information table in log 120 that tracks information about how a client such as mail server 106 is using the reputation service. For example, log 120 may include a Client Usage Stats table with the fields shown in TABLE 3:

TABLE 3

EXAMPLE LOG FILE TABLE

| field | type | comment |
| --- | --- | --- |
| ip | Unsigned Int | the IP making the query request |
| blocked | datetime | The time the IP was blocked, or NULL if the IP is not blocked. |
| num_queries | integer | Number of queries from this IP |
| num_queries_checked | integer | Number of queries checked for Authorization |
| Num_queries_invalid | integer | Number of queries with invalid authorization hash |

An offline process associated with reputation service 110 monitors log 120 for network addresses that are making an unacceptable number of unauthorized queries, and adds them to the blacklist. For example, statistics process 118 of reputation service 110 may perform log monitoring. However, queries from blocked addresses cannot be entirely ignored, as they may become authorized after being blocked. Therefore, blocked queries are logged separately, and immediately processed to check for authentication status changes.

When a host having a particular network address makes too many queries that are incorrect, as determined by a failure of validation logic 114 to validate the queries, the querying host is added to the blacklist 124 and subsequent queries are rejected by DNS logic 112 at step 324. When such a host begins making queries with valid hashes, it is then allowed to make queries. Mechanisms for de-authorizing and re-authorizing querying hosts are described further below In one embodiment, statistics process 118 periodically parses log 120 (or some sample thereof) and maintaining data on servers, clients or network addresses that are making queries. Statistics process may log total usage and may check authorization hashes in queries. Invalid queries are counted in log 120 by statistics process 118, while a single valid query will reset the count of invalid queries for that IP to zero.

In one embodiment, a Client De-authorization and Re-authorization process 122 periodically checks log 120 or communicates with statistics process 118 to identify servers, clients or network addresses exceeding a threshold of unauthorized queries. An example threshold is 100 invalid queries.

Servers, clients or network addresses that exceed the threshold are added to the blacklist 126.

In another embodiment, client de-authorization process 122 further processes log 122 to identify rejected queries to see if any previously rejected servers, clients or network addresses have started making valid queries. Any rejected address that makes a single valid request is rapidly removed from the blacklist, and the count of invalid requests for that address is reset to zero.

Referring now to FIG. 3C, an example approach for de-authorizing querying hosts initiates at step 350 and reads a log file entry at step 352. The log file entry relates to a prior query for reputation score information from a querying host. At step 354, the querying host is identified. At step 356, a test is performed to determine whether the query was invalid.

If the query was invalid, then in step 358 a counter of invalid queries for that querying host is incremented. The counter may be stored in database 116 or another repository. In step 360, a test is performed to determine whether an invalidation threshold for the querying host has been exceeded. The invalidation threshold may be obtained from the configuration file 124 for the querying host.

If the invalidation threshold has been exceeded, then in step 362 the querying host is placed in a blacklist, such as blacklist 124. If the invalidation threshold has not been exceeded, then in step 364 a test is performed to determine whether a license period for the querying host has expired. If so, then in step 362 the querying host is placed in a blacklist, such as blacklist 124. The license period test of step 364 is also performed when the query is determined to be valid at step 356.

The process of steps 352 to 362 may be repeated for all entries in the log file.

4.0 Implementation Mechanisms—Hardware Overview

Figure 4:
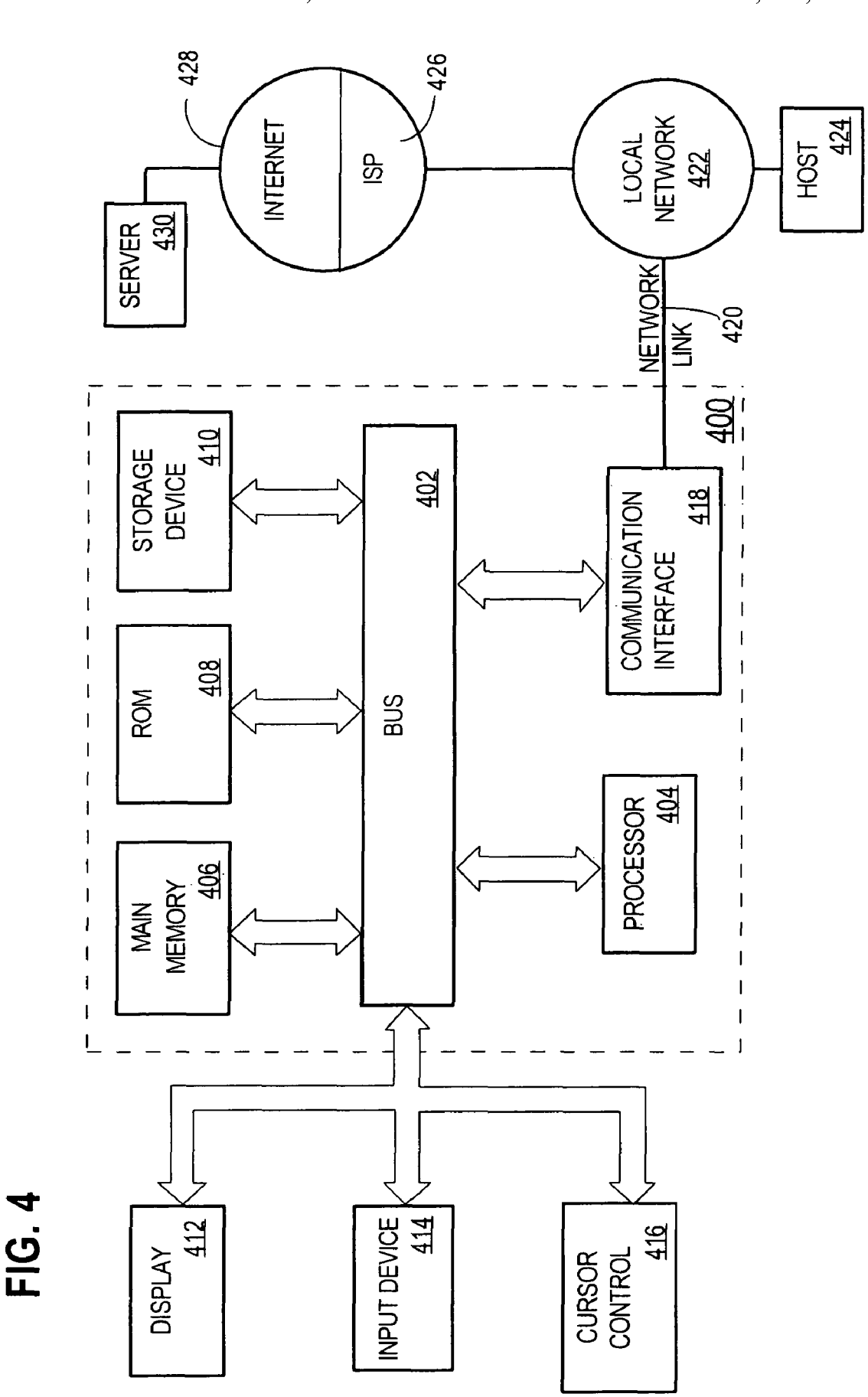
FIG. 4 is a block diagram that illustrates a computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for message processing approaches. According to one embodiment of the invention, message-processing approaches are provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for message processing approaches as described herein.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus, comprising:
   a network interface that is coupled to a data network for receiving one or more packet flows therefrom;
   a processor;
   one or more stored sequences of instructions which, when executed by the processor, cause the processor to perform:
   storing in the apparatus a secret string; wherein the secret string and a message authentication code algorithm identifier are distributed to a first host computer;
   receiving, from the first host computer, a DNS format query to obtain a reputation score associated with a second host computer,
      wherein the query includes a first authentication code that has been computed at the first host computer by executing the message authentication code algorithm over the secret string;
      wherein the DNS format query comprises an inverted Internet Protocol (IP) address of the second host computer concatenated with the first authentication code of the first host computer;
   in response to determining that the first host computer has a valid customer license to use services from the apparatus and that the customer license has not expired, validating the first authentication code by:
      computing, at the apparatus, a second authentication code by executing the message authentication code algorithm over the secret string, both stored in the apparatus, and
      determining that the validation is successful if the first authentication code and the second authentication code match;
   only when the first host computer has the valid customer license to use services from the apparatus, the customer license has not expired, and validating the first authentication code is successful, performing a DNS lookup in a reputation database and returning a DNS response that provides the reputation score associated with the second host computer;
   wherein the DNS lookup comprises determining which of paranoid, cautious, moderate and aggressive characteristics describes the second host computer.

2. The apparatus of claim 1, further comprising sequences of instructions which, when executed by the processor, cause the processor to perform sending an NXDOMAIN record to the first host computer when validating the first authentication code is unsuccessful.

3. The apparatus of claim 1, further comprising sequences of instructions which, when executed by the processor, cause the processor to perform determining whether the first host computer is listed in a blacklist, and sending an NXDOMAIN record to the first host computer without validating the authentication code when the first host computer is listed in the blacklist.

4. The apparatus of claim 1, further comprising sequences of instructions which, when executed by the processor, cause the processor to perform:
   establishing a master domain and a plurality of subdomains, wherein each of the subdomains is associated with a respective customer group;
   receiving the DNS format query from the first host computer at a particular subdomain that is associated with a particular customer group, wherein the first host computer is associated with the particular customer group, wherein the DNS format query includes an identifier of the particular customer group.

5. The apparatus of claim 4, further comprising sequences of instructions which, when executed by the processor, cause the processor to perform:
   retrieving configuration information associated with the particular customer group, wherein the configuration information for the particular customer group maps one or more discrete sets of reputation values to respective responsive actions;
   determining, by mapping the reputation score for the second host computer to one of the discrete sets in the configuration information, a particular responsive action; and
   performing the particular responsive action.

6. The apparatus of claim 1, further comprising sequences of instructions which, when executed by the processor, cause the processor to perform:
   creating and storing, in a log file, a log entry that identifies the first host computer and whether validation of the DNS format query was successful;
   periodically reading the log file, determining whether the first host computer has issued a number of queries that exceeds an invalidation threshold for the first host computer, and adding the first host computer to a blacklist when the first host computer has issued a number of queries that exceeds an invalidation threshold for the first host computer.

7. The apparatus of claim 1, further comprising sequences of instructions which, when executed by the processor, cause the processor to perform:
   retrieving configuration information associated with the first host computer, wherein the configuration information identifies a time in which the first host computer is allowed to send queries;

determining whether the time has expired;
adding the first host computer to a blacklist when the time has expired.

8. An apparatus, comprising:
one or more processors;
a non-transitory computer-readable storage medium storing one or more sequences of instructions which, when executed by the one or more processors, cause the one or more processors to perform:
storing in the apparatus a secret string; wherein the secret string and a message authentication code algorithm identifier are distributed to a first host computer;
receiving, from the first host computer, a DNS format query to obtain a reputation score associated with a second host computer,
wherein the query includes a first authentication code that has been computed at the first host computer by executing the message authentication code algorithm over the secret string,
wherein the DNS format query comprises an inverted Internet Protocol (IP) address of the second host computer concatenated with the first authentication code of the first host computer;
determining whether the first host computer is allowed to use services from the apparatus;
validating the first authentication code in response to the determining that the first host computer has a valid customer license to use services from the apparatus and that the customer license has not expired, by:
computing, at the apparatus, a second authentication code by executing the message authentication code algorithm over the secret string, both stored in the apparatus, and
determining that the validation is successful if the first authentication code and the second authentication code match; and
performing a DNS lookup in a reputation database and returning a DNS response that provides the reputation score associated with the second host computer only when the first host computer has the valid customer license to use services from the apparatus, the customer license has not expired, and validating the first authentication code is successful;
wherein the DNS lookup comprises determining which of paranoid, cautious, moderate and aggressive characteristics describes the second host computer.

9. The apparatus of claim 8, wherein the non-transitory computer-readable storage medium further comprises instructions which, when executed, cause the one or more processors to perform sending an NXDOMAIN record to the first host computer when validating the first authentication code is unsuccessful.

10. The apparatus of claim 8, wherein the non-transitory computer-readable storage medium further comprises instructions which, when executed, cause the one or more processors to perform determining whether the first host computer is listed in a blacklist, and sending an NXDOMAIN record to the first host computer without validating the authentication code when the first host computer is listed in the blacklist.

11. The apparatus of claim 8, wherein the non-transitory computer-readable storage medium further comprises instructions which, when executed, cause the one or more processors to perform:
establishing a master domain and a plurality of subdomains, wherein each of the subdomains is associated with a respective customer group;
receiving the DNS format query from the first host computer at a particular subdomain that is associated with a particular customer group, wherein the first host computer is associated with the particular customer group, wherein the DNS format query includes an identifier of the particular customer group.

12. The apparatus of claim 11, wherein the non-transitory computer-readable storage medium further comprise instructions which, when executed, cause the one or more processors to perform:
retrieving configuration information associated with the particular customer group, wherein the configuration information for the particular customer group maps one or more discrete sets of reputation values to respective responsive actions;
determining, by mapping the reputation score for the second host computer to one of the discrete sets in the configuration information, a particular responsive action; and
performing the particular responsive action.

13. The apparatus of claim 8, wherein the non-transitory computer-readable storage medium further comprises instructions which, when executed, cause the one or more processors to perform:
creating and storing, in a log file, a log entry that identifies the first host computer and whether validation of the DNS format query was successful;
periodically reading the log file, determining whether the first host computer has issued a number of queries that exceeds an invalidation threshold for the first host computer, and for adding the first host computer to a blacklist when the first host computer has issued a number of queries that exceeds an invalidation threshold for the first host computer.

14. The apparatus of claim 8, wherein the non-transitory computer-readable storage medium further comprises instructions, which when executed, cause the one or more processors to perform:
retrieving configuration information associated with the first host computer, wherein the configuration information identifies a time in which the first host computer is allowed to send queries;
determining whether the time has expired;
adding the first host computer to a blacklist when the time has expired.

15. A machine-implemented method comprising:
storing in an apparatus a secret string; wherein the secret string and a message authentication code algorithm identifier are distributed to a first host computer;
receiving, from the first host computer, a DNS format query to obtain a reputation score associated with a second host computer,
wherein the query includes a first authentication code that has been computed at the first host computer by executing the message authentication code algorithm over the secret string;
wherein the DNS format query comprises an inverted Internet Protocol (IP) address of the second host computer concatenated with the first authentication code of the first host computer;
in response to determining that the first host computer has a valid customer license to use services from the apparatus and that the customer license has not expired, validating the first authentication code by:

computing, at the apparatus, a second authentication code by executing the message authentication code algorithm over the secret string, both stored in the apparatus, and determining that the validation is successful if the first authentication code and the second authentication code match;

only when the first host computer has the valid customer license to use services from the apparatus, the customer license has not expired, and validating the first authentication code is successful, performing a DNS lookup in a reputation database and returning a DNS response that provides the reputation score associated with the second host computer;

wherein the DNS lookup comprises determining which of paranoid, cautious, moderate and aggressive characteristics describes the second host computer;

wherein the method is performed by one or more processors.

16. The method of claim 15, further comprising sending an NXDOMAIN record to the first host computer when validating the first authentication code is unsuccessful.

17. The method of claim 15, further comprising determining whether the first host computer is listed in a blacklist, and sending an NXDOMAIN record to the first host computer without validating the authentication code when the first host computer is listed in the blacklist.

18. The method of claim 15, further comprising:

establishing a master domain and a plurality of subdomains, wherein each of the subdomains is associated with a respective customer group;

receiving the DNS format query from the first host computer at a particular subdomain that is associated with a particular customer group, wherein the first host computer is associated with the particular customer group, wherein the DNS format query includes an identifier of the particular customer group.

19. The method of claim 18, further comprising:

retrieving configuration information associated with the particular customer group, wherein the configuration information for the particular customer group maps one or more discrete sets of reputation values to respective responsive actions;

determining, by mapping the reputation score for the second host computer to one of the discrete sets in the configuration information, a particular responsive action; and performing the particular responsive action.

20. The method of claim 15, further comprising:

creating and storing, in a log file, a log entry that identifies the first host computer and whether validation of the DNS format query was successful;

periodically reading the log file, determining whether the first host computer has issued a number of queries that exceeds an invalidation threshold for the first host computer, and adding the first host computer to a blacklist when the first host computer has issued a number of queries that exceeds an invalidation threshold for the first host computer.

21. The method of claim 15, further comprising:

retrieving configuration information associated with the first host computer, wherein the configuration information identifies a time in which the first host computer is allowed to send queries;

determining whether the time has expired;

adding the first host computer to a blacklist when the time has expired.

22. A non-transitory computer-readable volatile or non-volatile storage medium storing one or more sequences of instructions, which when executed by one or more processors, cause the one or more processors to carry out the steps of:

storing in an apparatus a secret string; wherein the secret string and a message authentication code algorithm identifier are distributed to a first host computer;

receiving, from the first host computer, a DNS format query to obtain a reputation score associated with a second host computer, wherein the query includes a first authentication code that has been computed at the first host computer by executing the message authentication code algorithm over the secret string;

wherein the DNS format query comprises an inverted Internet Protocol (IP) address of the second host computer concatenated with the first authentication code of the first host computer;

in response to determining that the first host computer has a valid customer license to use services from the apparatus and that the customer license has not expired, validating the first authentication code by:

computing, at the apparatus, a second authentication code by executing the message authentication code algorithm over the secret string, both stored in the apparatus, and determining that the validation is successful if the first authentication code and the second authentication code match;

only when the first host computer has the valid customer license to use services from the apparatus, the customer license has not expired, and validating the first authentication code is successful, performing a DNS lookup in a reputation database and returning a DNS response that provides the reputation score associated with the second host computer;

wherein the DNS lookup comprises determining which of paranoid, cautious, moderate and aggressive characteristics describes the second host computer.

23. The computer-readable medium of claim 22, further comprising sequences of instructions which, when executed by the processor, cause the processor to perform sending an NXDOMAIN record to the first host computer when validating the first authentication code is unsuccessful.

24. The computer-readable medium of claim 22, further comprising sequences of instructions which, when executed by the processor, cause the processor to perform determining whether the first host computer is listed in a blacklist, and sending an NXDOMAIN record to the first host computer without validating the authentication code when the first host computer is listed in the blacklist.

25. The computer-readable medium of claim 22, further comprising sequences of instructions which, when executed by the processor, cause the processor to perform:

establishing a master domain and a plurality of subdomains, wherein each of the subdomains is associated with a respective customer group;

receiving the DNS format query from the first host computer at a particular subdomain that is associated with a particular customer group, wherein the first host computer is associated with the particular customer group, wherein the DNS format query includes an identifier of the particular customer group.

26. The computer-readable medium of claim 25, further comprising sequences of instructions which, when executed by the processor, cause the processor to perform:

retrieving configuration information associated with the particular customer group, wherein the configuration information for the particular customer group maps one or more discrete sets of reputation values to respective responsive actions;

determining, by mapping the reputation score for the second host computer to one of the discrete sets in the configuration information, a particular responsive action; and performing the particular responsive action.

27. The computer-readable medium of claim 22, further comprising sequences of instructions which, when executed by the processor, cause the processor to perform:

creating and storing, in a log file, a log entry that identifies the first host computer and whether validation of the DNS format query was successful;

periodically reading the log file, determining whether the first host computer has issued a number of queries that exceeds an invalidation threshold for the first host computer, and adding the first host computer to a blacklist when the first host computer has issued a number of queries that exceeds an invalidation threshold for the first host computer.

28. The computer-readable medium of claim 22, further comprising sequences of instructions which, when executed by the processor, cause the processor to perform:

retrieving configuration information associated with the first host computer, wherein the configuration information identifies a time in which the first host computer is allowed to send queries;

determining whether the time has expired.

* * * * *